United States Patent
Ayala Diaz et al.

(10) Patent No.: US 9,908,475 B2
(45) Date of Patent: Mar. 6, 2018

(54) SECUREMENT SYSTEM FOR A STORAGE AREA OF A VEHICLE

(71) Applicant: GM GLOBAL TECHNOLOGY OPERATIONS LLC, Detroit, MI (US)

(72) Inventors: Cesar Alejandro Ayala Diaz, Texcoco (MX); Alejandro Valencia Angeles, Calimaya (MX); Rodolfo De La Mora Ramirez, Toluca (MX)

(73) Assignee: GM Global Technology Operations LLC, Detroit, MI (US)

( * ) Notice: Subject to any disclaimer, the term of this patent is extended or adjusted under 35 U.S.C. 154(b) by 78 days.

(21) Appl. No.: 15/208,865

(22) Filed: Jul. 13, 2016

(65) Prior Publication Data

US 2018/0016817 A1    Jan. 18, 2018

(51) Int. Cl.

| B60R 7/04 | (2006.01) |
|---|---|
| B62D 25/08 | (2006.01) |
| E05B 85/10 | (2014.01) |
| E05B 77/12 | (2014.01) |
| E05B 83/28 | (2014.01) |
| B62D 43/10 | (2006.01) |

(52) U.S. Cl.
CPC .............. *B60R 7/04* (2013.01); *B62D 25/087* (2013.01); *E05B 77/12* (2013.01); *E05B 83/28* (2013.01); *E05B 85/10* (2013.01); *B62D 43/10* (2013.01)

(58) Field of Classification Search
CPC ........ B62D 43/10; B62D 25/087; B60R 7/04; E05B 77/12; E05B 83/28

USPC ....................................................... 296/37.14
See application file for complete search history.

(56) References Cited

U.S. PATENT DOCUMENTS

| 4,739,896 A * | 4/1988 | Moss .................. E02D 29/1427 220/324 |
|---|---|---|
| 5,056,846 A * | 10/1991 | Tanaka ..................... B60R 5/04 292/83 |
| 6,033,003 A * | 3/2000 | Bell ........................ B60R 13/01 296/37.3 |
| 6,802,550 B1 * | 10/2004 | Griggs, Jr. ........... B60N 2/4686 292/136 |
| 6,883,851 B2 * | 4/2005 | McClure ................. B60R 13/01 224/42.2 |
| 6,945,594 B1 * | 9/2005 | Bejin ....................... B60R 5/04 296/193.07 |
| 7,631,919 B2 * | 12/2009 | Schrader ............ B62D 33/0273 296/37.14 |

(Continued)

*Primary Examiner* — Jason S Morrow
(74) *Attorney, Agent, or Firm* — Quinn IP Law (57) ABSTRACT

A securement system is provided for use with a storage area of a vehicle having a cover panel adjustably positionable relative to the storage area. The securement system includes a locking portion cooperating with the cover panel including a body having a first end and an opposing second end terminating at a securement member. A receiving portion cooperates with the storage area and includes a housing, a channel extending at least partially through the receiving portion housing to receive and engage the locking portion securement member. The receiving portion channel includes a first passage configured to receive the locking portion securement member and a second passage configured to guide the locking portion body between at least a first position and a second position to receive and secure the securement member.

20 Claims, 4 Drawing Sheets

(56) References Cited

U.S. PATENT DOCUMENTS

| | | | | |
|---|---|---|---|---|
| 8,205,926 B2* | 6/2012 | Beckley | ............... | B60R 5/04 296/37.14 |
| 2010/0078956 A1* | 4/2010 | Aebker | ............... | B60R 5/04 296/37.13 |
| 2015/0251712 A1* | 9/2015 | Craven | ............ | B62D 43/06 296/37.2 |

* cited by examiner

SECUREMENT SYSTEM FOR A STORAGE AREA OF A VEHICLE

TECHNICAL FIELD

The present disclosure relates to a storage area for a vehicle, and more particularly, to a securement system for a storage area of a vehicle.

BACKGROUND

Vehicles may include a load floor that is configured to support cargo in a cargo area. For example, minivans and sport-utility vehicles typically include a cargo area in the rear of the vehicle. Access to the cargo area is provided by a rear body opening that is selectively closed by a rear closure panel, such as a tailgate or a lift gate. Similarly, pickup trucks include a cargo area, i.e., a cargo box, with access to the cargo box being provided by an opening at the rear of the truck and that is selectively closed by a tailgate. The load floor forms the lower surface of the cargo area or cargo box.

Trough-shaped cargo spaces may be embedded in a motor vehicle floor which can be covered using a lid element flush with the motor vehicle floor. The lid element is coupled via a joint to a wall of the storage space or the motor vehicle floor. Traditional latch elements that releasably secure the lid element adjacent the cargo space may fail to maintain the position of the lid element during a vehicle deceleration event.

SUMMARY

A securement system is provided for use with a cargo area at least partially defined between opposing sidewalls and a load floor of a vehicle. A cover panel is adjustably connected adjacent an opening in the load floor and is movable between a first position at least partially covering the opening and cargo space and at least one second position. The securement system includes a locking portion cooperating with the cover panel and includes a body having a first end and an opposing second end terminating at a securement member.

A receiving portion includes a housing cooperating with the cargo area. The housing includes a channel extending at least partially through the housing to receive and engage the locking portion securement member. The channel includes a first passage configured to receive the locking portion securement member and a second passage configured to guide the locking portion body between at least a first position and a second position to receive and secure the locking portion securement member.

In one embodiment of the disclosure, a handle assembly disposed on the cover panel includes a handle housing having a first portion, an opposing second portion and a recess defined therebetween. The first end of the locking portion body may be disposed on the second portion of the handle housing. The locking portion body may include a first end wall, a second end wall and an opposing pair of sidewalls extending therebetween.

The second end wall of the locking portion body includes an angular guide surface extending between the upper end and the locking portion securement member on the lower end of the locking portion body that cooperates with the second passage to position the locking portion securement member adjacent a surface of the receiving portion housing when the locking portion is moved from the first position or second position to a third position. The first and second passages of the receiving portion channel are disposed in a cross-shaped pattern in the receiving portion housing. The locking portion securement member may be formed as a cylindrical projection on the lower end of the locking portion body that is sized to extend through the first passage of the receiving portion channel.

In another embodiment of the disclosure, a storage area in a vehicle cargo area at least partially defined between opposing sidewalls and a load floor of the vehicle includes a storage area housing disposed adjacent an opening in the load floor. A cover panel is adjustably connected adjacent the load floor opening and is movable between a first position at least partially covering the storage area housing and at least one second position. A handle assembly is disposed on the cover panel and includes a handle housing defining a first portion, an opposing second portion and a recess defined therebetween.

A securement system includes a locking portion having a first end disposed on the second portion of the handle assembly and a second end terminating at a securement member. A receiving portion cooperates with the storage area housing and includes a channel extending at least partially through the receiving portion to receive and engage the locking portion securement member. The channel includes a first passage configured to receive the locking portion securement member and a second passage configured to guide the locking portion body between at least a first position and a second position to receive and secure the locking portion securement member.

The storage area housing may be integrally formed in the load floor of the vehicle. Alternatively, the storage area housing may be secured to a surface of the load floor adjacent the opening in the load floor of the vehicle. The locking portion body further comprises a first end wall, a second end wall and an opposing pair of sidewalls extending therebetween. The second end wall of the locking portion body includes an angular guide surface extending between the first end of the locking portion body and the locking portion securement member on the second end of the locking portion body.

The first end wall of the locking portion body may include a generally vertical surface that cooperates with the second passage to position the locking portion securement member in the second position. The guide surface of the second end wall of the locking portion body cooperates with the second passage to position the locking portion securement member adjacent a surface of the receiving portion housing when the locking portion is moved from the first position or the second or engaged position to a third position. The first and second passages of the receiving portion channel are disposed in a cross-shaped pattern in the receiving portion. The locking portion securement member may be formed as a cylindrical projection on the second end of the locking portion body that is sized to extend through the first passage of the receiving portion channel.

In yet another embodiment of the disclosure, a vehicle having an interior cargo area defined between a roof, opposing lateral sidewalls and a load floor of a body of the vehicle includes a storage area housing. The storage area housing is disposed adjacent an opening in the load floor. A cover panel is adjustably connected adjacent the opening in the load floor movable between a first position at least partially covering the storage area housing and at least one second position.

A handle assembly is disposed on the cover panel and includes a handle housing defining a first portion, an opposing second portion and a recess defined therebetween. A securement system includes a locking portion having a first end disposed on the second portion of the handle assembly and an opposing second end terminating at a securement member. A receiving portion includes a housing having a channel extending at least partially through the housing to receive and engage the locking portion securement member. The channel includes a first passage configured to receive the locking portion securement member and a second passage configured to guide the locking portion body between at least a first position and a second position to receive and secure the locking portion securement member.

The locking portion body includes a first end wall, a second end wall and an opposing pair of sidewalls extending therebetween, wherein the second end wall includes an angular guide surface extending between the first end and the locking portion securement member on the second end of the locking portion body. The first end wall of the locking portion body may include a generally vertical surface that cooperates with the second passage to position the locking portion securement member in the second position.

The angular guide surface of the second end wall of locking portion body cooperates with the second passage to position the locking securement member adjacent a surface of the receiving portion housing when the locking portion is moved from the first position or the second position to a third position. The first and second passages of the receiving portion channel may be disposed in a cross-shaped pattern in the receiving portion. The locking portion securement member may be formed as a cylindrical projection on the second end of the locking portion body that is sized to extend through the first passage of the receiving portion channel.

The above noted and other features and advantages of the present disclosure are readily apparent from the following detailed description when taken in connection with the accompanying drawings.

DETAILED DESCRIPTION

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Figure 1:
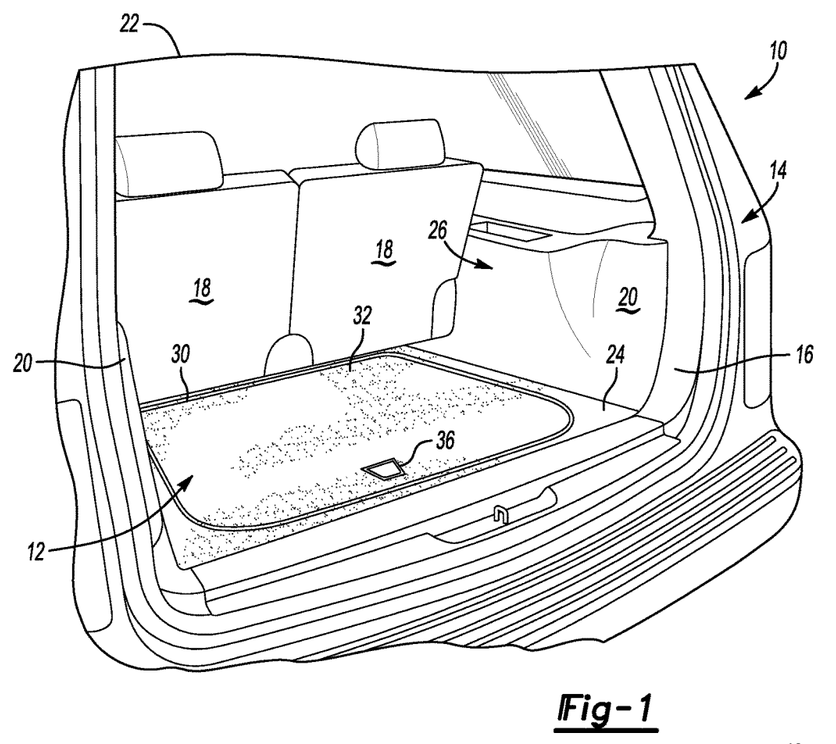
FIG. 1 is a perspective view of a rear end of a vehicle having a storage area disposed in an interior cargo area.

Referring to the drawings, wherein like reference numbers correspond to like or similar components throughout the several Figures, FIG. 1 shows a schematic view of a motor vehicle 10. Vehicle 10 is shown for illustrative purposes and demonstrates only one possible environment into which a storage compartment or area 12 may be defined. It is understood that the vehicle may be any mobile platform, such as an airplane, all-terrain vehicle (ATV), boat, personal movement device, robot and the like to accomplish the purposes of this disclosure.

A body 14 of the vehicle 10 includes a rear door opening 16. A vehicle seat 18 is disposed within an interior of the vehicle 10 and is accessible through the rear door opening 16. Opposing lateral sidewalls 20 of the vehicle body 14 include an interior portion extending between a roof 22 of the vehicle body 14 and a load floor 24. An interior cargo area 26 is at least partially defined between opposing sidewalls 20 and a load floor 24.

It is understood that use of direction terms relative to the vehicle orientation may be used throughout the description regarding location of the components within the vehicle 10. Thus, the forward direction would be toward an engine compartment for the vehicle 10 and opposite the rear end of the vehicle 10.

In one embodiment of the disclosure, storage area 12 may be disposed within or placed proximate to the load floor 24 of vehicle 10. However, it is understood, as will be described in greater detail below, that the storage area 12 and securement system 62 may be provided in other areas of the vehicle 10, including, but not limited to, a vehicle glove box, an instrument panel console, an overhead console, a vehicle electronic console, a floor console or the like. It is also understood that the retention system may be utilized in a variety of non-vehicle related technology areas, including, but not limited to, latch systems for laptop computers and the like. The load floor 24 may include a floor covering or upholstery, such as carpet or the like, to match with the interior of the vehicle 10.

Load floor 24 may be generally horizontal to and parallel with the rear door opening 16. Storage area 12 in the cargo area 26 includes a cargo space 28 defined by a storage area housing cooperating with an opening 30 in the load floor 24. The load floor 24 and the storage area housing of cargo space 28 of the storage area 12 may be integrally formed as a unitary structure or may be formed as distinct parts such that the storage area housing of cargo space 28 is secured to the load floor 24 adjacent opening 30 to house a spare tire, luggage, or the like in the cargo space 28.

Figure 2:
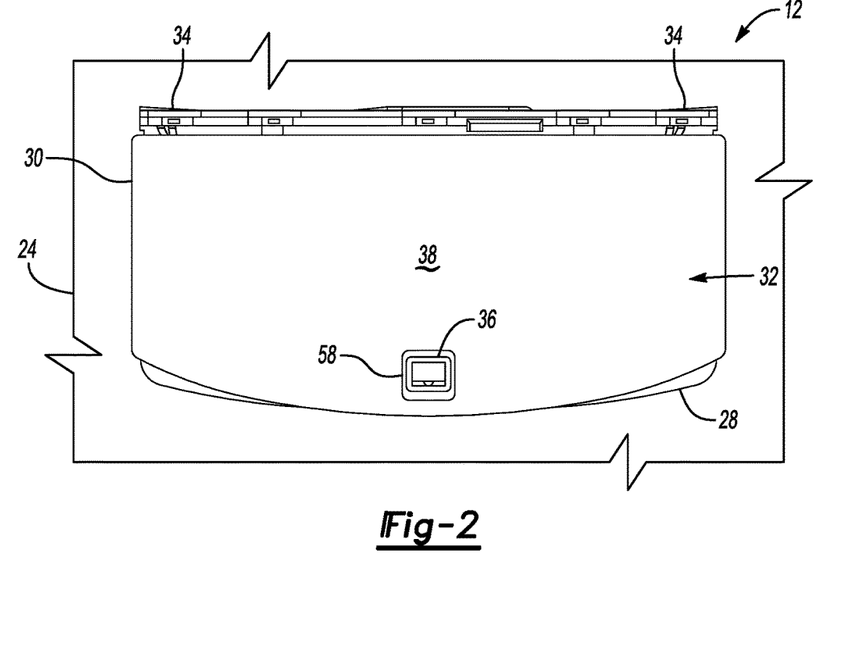
FIG. 2 is a top plan view of the storage area and securement system provided in a load floor of a vehicle interior cargo area in accordance with the disclosure.
Figure 3:
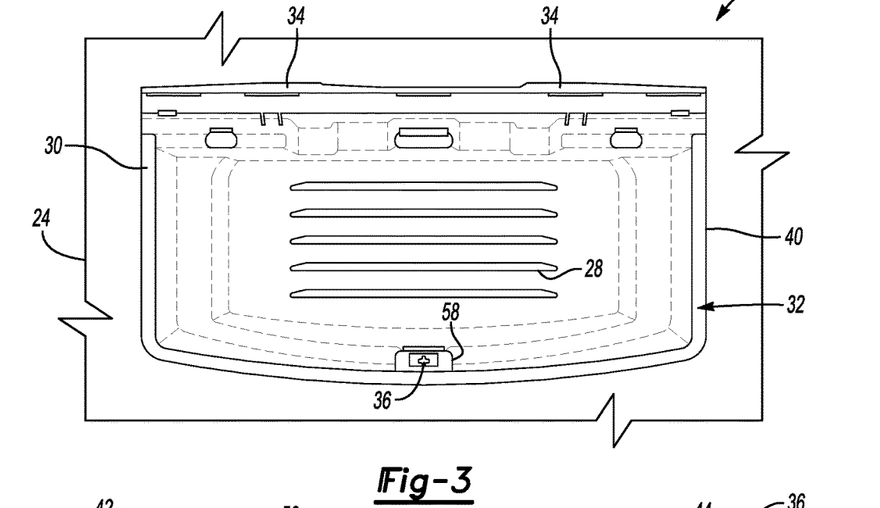
FIG. 3 is a bottom plan view of the storage area and securement system disposed in the load floor of the vehicle interior cargo area.
Figure 4:
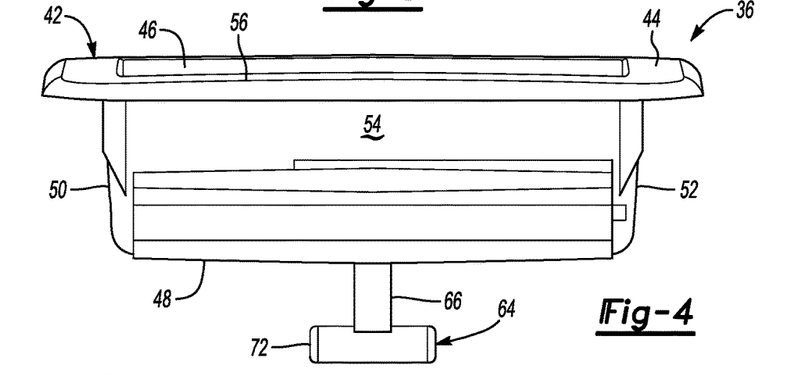
FIG. 4 is a rear plan view of a handle assembly for use with the securement system in accordance with the disclosure.

Referring now to FIGS. 2 and 3, a cover panel 32 is disposed adjacent the opening 30 of the storage area 12 and configured for selectively uncovering and at least partially covering the opening 30 in the load floor 24. Cover panel 32 is adjustably connected to at least one of the load floor 24 by one or more adjustable position devices 34, such as hinges, living hinges or other similar devices. The cover panel 32 may be adjustably positioned between a first or closed position wherein the cover panel 32 is substantially parallel to and coplanar with the load floor 24 to at least partially cover the opening 30 and at least one second or open position wherein the cover panel 32 extends away from opening 30 in the load floor 24 to expose the cargo space 28.

In the first or closed position, the cover panel 32 is configured to at least partially conceal contents within the cargo space 28. The load floor 24 and cover panel 32 cooperate to provide a contiguous surface to receive and support objects thereon. In a second or at least one open position (not shown), cover panel 32 is moved away from the opening 30 adjacent the cargo space 28 of the storage area 12 to allow access to the cargo space 28. Alternatively, the cover panel may be removably disposed in the opening 30 of the load floor 24.

The cover panel 32 shown in the Figures is releasably securable adjacent the opening 30 in the load floor 24 by a handle assembly 36 or pull feature. However, the handle assembly 36 may not be required and other features may be used to access the storage area 12. Cover panel 32 may be constructed from a composite or plastic material and include a first or upper surface 38 and an opposing second or lower surface 40. First surface 38 of the cover panel 32 defines a load bearing surface and may be covered or upholstered with material to match with the interior cargo area of the vehicle 10.

Referring now to FIGS. 4-7, handle assembly 36 of the storage area 12 in accordance with this disclosure is illustrated. A housing 42 of the handle assembly 36 includes a first or upper portion 44 having an opening 46 formed therein, an opposing second or lower portion 48 from the first portion 44 and opposing lateral sidewalls 50, 52 extending therebetween. A recess 54 is formed between the second portion 48 and opposing lateral sidewalls 50, 52 of housing 42 that is in communication with the opening 46 in the first portion 44 of housing 42. The first portion 44 of housing 42 may include a projection 56 that extends at least partially into opening 46. Recess 54 and projection 56 may cooperate to provide a gripping surface or hand placement area allowing a user to grasp the handle assembly 36 to move the cover panel 32 of the storage area 12 from the first position at least partially covering the opening and cargo space to the at least one second or open position.

Figure 5:
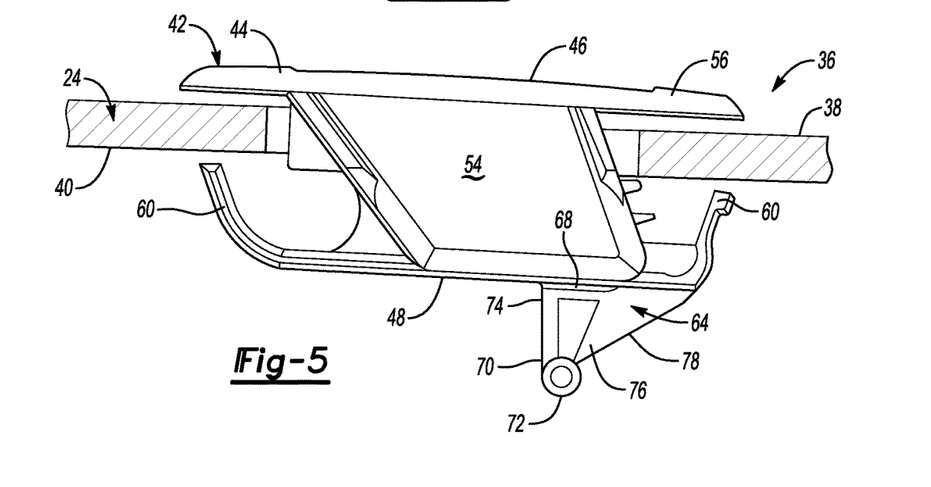
FIG. 5 is a side plan view of a handle assembly for use with the securement system.

As is shown in FIG. 5, handle assembly 36 is positioned on the cover panel 32 of storage area 12. Housing 42 of the handle assembly 36 is disposed within and extends through an aperture 58 provided in the cover panel 32 as is best shown in FIGS. 2 and 3. In one embodiment of the disclosure, handle assembly housing 42 includes at least one member 60 extending from the housing 42 to engage the second surface 40 of the cover panel 32. Members 60 cooperate with the second surface 40 of the cover panel 32 to secure the handle assembly 36 to the cover panel 32. It is contemplated that the at least one member 60 may extend from the second portion 48 of the housing 42 and be resilient in at least one degree of motion to ensure the housing 42 is secured to the cover panel 32.

A securement system, generally referenced by numeral 62, is disposed on a cover panel 32 to removably secure the cover panel 32 adjacent the opening 30 cooperating with cargo space 28 of the storage area 12. It is understood that the securement system may include cover panel 32 or, alternatively, may be cooperate with the cover panel 32 through handle assembly 36. Securement system 62 includes a locking portion 64 and a receiving portion 80. In one embodiment of the disclosure, locking portion 64 generally extends from the handle assembly 36 disposed on the cover panel 32. It is also contemplated that the locking portion 64 of the securement system 62 may be disposed on or connected to a portion of the cover panel 32 to accomplish the objectives of the disclosure.

Figure 6:
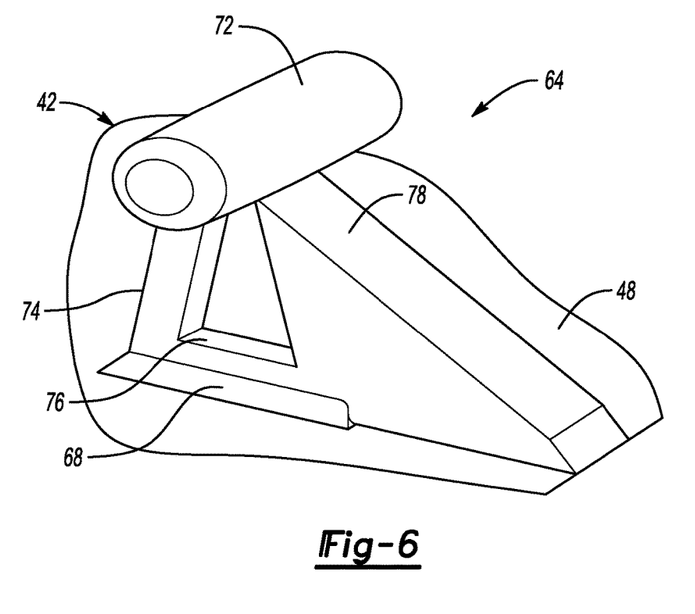
FIG. 6 is a perspective view of a mating portion of the securement system.

Referring to FIGS. 5 and 6, locking portion 64 includes a locking portion body 66 having a first end 68 extending from the second portion 48 of handle assembly housing 42 and a second end 70 terminating in a mating portion or securement member 72. In one embodiment of the disclosure, the mating portion or securement member 72 may be formed as a cylindrical projection that extends from the second end 70 of the locking portion body 66 and is generally perpendicular relative to the locking portion body 66 of the latching mechanism. It is understood that the geometry and position of the mating portion or securement member 72 and locking portion body 66 of the locking portion 64 of the disclosure may be adjusted to a variety of positions while still accomplishing the objectives of the disclosure.

The locking portion 64 may include a first end wall 74, an opposing pair of sidewalls 76 extending between the first end wall and a second end wall guide surface 78. The first end wall 74 may extend generally vertically between the second portion 48 and the securement member 72. The second end wall 78 may be angular as viewed in a side profile shown in FIG. 5 as the end wall extends between the mating portion or securement member 72 and the second portion 48 of the handle assembly housing 42.

Figure 7:
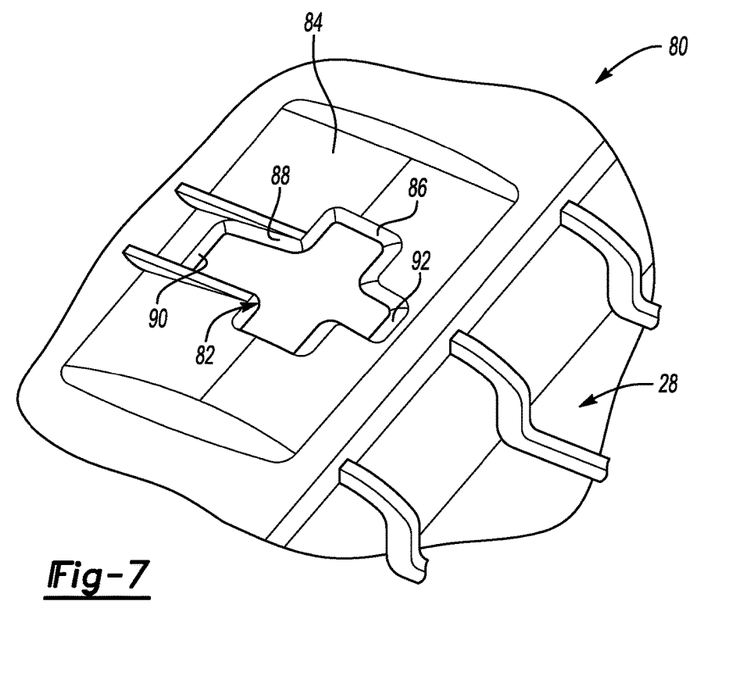
FIG. 7 is a perspective view of a receiving portion of the securement system.

Referring now to FIG. 7, a receiving portion of the securement system 62, generally referenced by numeral 80, is provided adjacent to or disposed on the cargo space 28 of the storage area 12. Receiving portion 80 includes a channel 82 formed therein and extending at least partially through the receiving portion housing 84 cooperating with the cargo space 28 that is configured to receive and engage the mating portion or securement member 72 of the locking portion 64 of the securement system 62 of handle assembly 36. Channel 82 and housing 84 may be integrally formed into the cargo space 28 or load floor 24. Alternatively, channel 82 and housing 84 may be positioned on and secured to at least one of the load floor 24, cargo space 28 or the like. In one embodiment of the disclosure, channel 82 is formed in housing 84 with a pair of slots or passages. The passages of channel 82 extend in a cross-shaped pattern in the housing 84 to create a first passage 86 and a second passage 88 extending perpendicular to the first passage 86.

Figure 8:
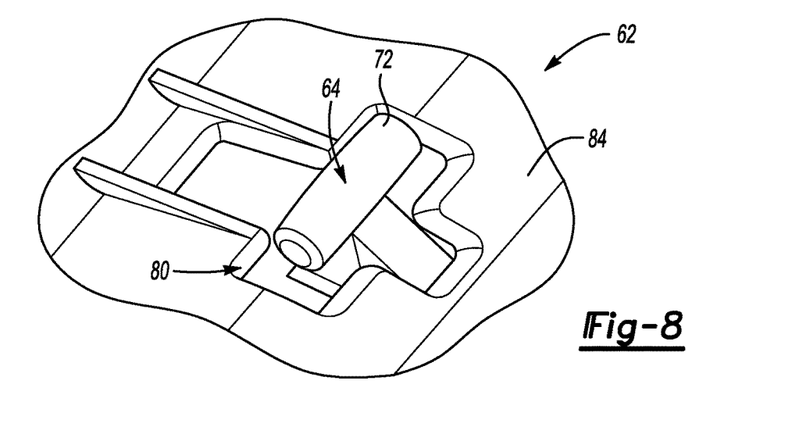
FIG. 8 is a perspective view of the securement system in a first or initial position.
Figure 9:
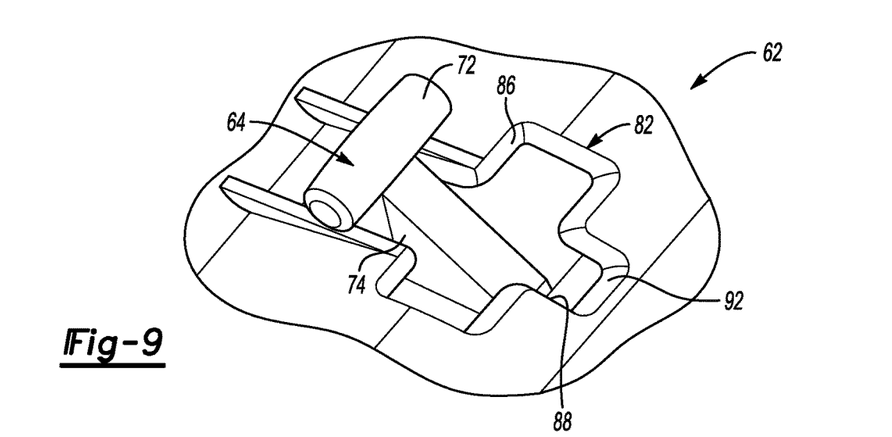
FIG. 9 is a perspective view of the securement system in a second or engaged position.
Figure 10:
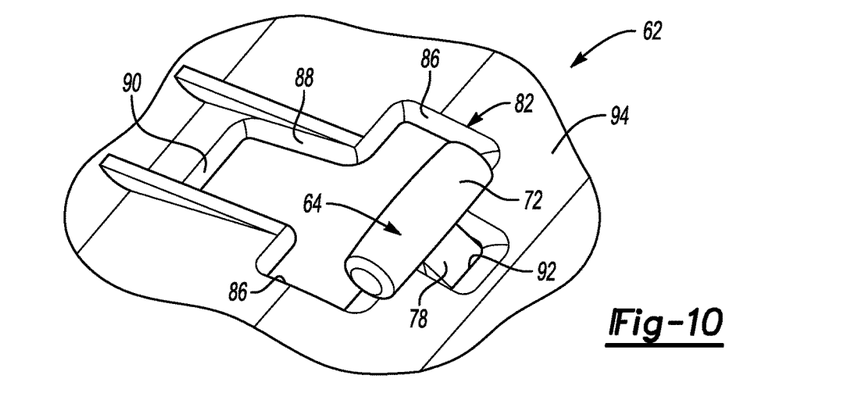
FIG. 10 is a perspective view of the securement system in a third or deployed position.

Referring additionally to FIGS. 8-10, the interconnection of the locking portion 64 and receiving portion 80 of the securement system 62 for use with the storage area 12 is described in greater detail. FIG. 8 illustrates placement of the locking portion 64 in a first position proximate to the receiving portion 80 such that the cover panel 32 will be disposed adjacent the opening 30 in the cargo space 28 of storage area 12. Mating portion or securement member 72 extending from locking portion body 66 of locking portion 64 is inserted through the first passage 86 of the channel 82 of the receiving portion 80. It is contemplated that the first passage 86 is sized to receive securement member 72 as it is inserted through the first passage 86 such that, when handle assembly 36 is positioned to at least one released position, securement member 72 of locking portion 64 will disengage the receiving portion 80 through the first passage 86 to allow the cover panel 32 to be adjusted away from the opening 30 of storage area 12.

The locking portion 64 of the securement system 62 is moved from the first position illustrated in FIG. 8 to a second or engagement position as illustrated in FIG. 9. In this second position illustrated in FIG. 9, the locking portion body 66 is translated through the second passage 88 of channel 82 of the receiving portion 80 such that mating portion or securement member 72 is moved proximate to a first end 90 of the second passage 88.

It is contemplated that the second passage 88 may be sized to receive the locking portion body 66 and allow travel of the locking portion body 66 through the second passage 88. Further, second passage 88 may be sized to limit vertical travel of the securement member 72 through the second passage 88. The first end 90 of the second passage 88 engages the generally vertical first end wall 74 of locking portion body 66 to position the locking portion 64 in the second or engaged position with the receiving portion 80. In this second or engaged position, the cover panel 32 is positioned to at least partially cover the opening 30 in the cargo space 28 of storage area 12.

The receiving portion 80 may be configured to ensure that the locking portion 64 is retained within the receiving portion 80 in case of a vehicle deceleration event. As illustrated in the Figures, locking portion 64 is placed in the second or engaged position adjacent a forward section of the receiving portion 80. The occurrence of a sudden vehicle deceleration event may allow the locking portion body 66 to travel rearward through the second passage 88 of the channel 82 toward a second end 92 of the second passage 88.

FIG. 10 illustrates a third or deployed position of the securement system 62 which ensures that the cover panel 32 of the storage area 12 does not inadvertently open in response to the vehicle deceleration event, thereby maintaining the cover panel 32 adjacent the opening 30 in the cargo space 28. The angled surface or end wall 78 of the locking portion body 66 engages the second end 92 of the second passage 88 as the locking portion body 66 travels through the second passage 88. The travel of the angled surface of end wall 78 along the second end 92 of the second passage 88 forces the securement member 72 to engage a surface 94 of the receiving portion housing 84 such that cover panel 32 illustrated in FIGS. 1-3 remains adjacent the opening 30 in the cargo space 28. Conversely, upon cessation of the vehicle deceleration event, the locking portion body 66 may travel forward through the second passage 88 toward the first end 90 of the second passage 88 to place the locking portion in a second or engaged position with the receiving portion 80 of the securement system 62.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A securement system for a cargo area at least partially defined between opposing sidewalls and a load floor of a vehicle comprising:
a cover panel adjustably connected adjacent an opening in the load floor movable between a first position at least partially covering the opening and at least one second position;
a locking portion including a body having a first end cooperating with the cover panel and a second end terminating at a securement member; and
a receiving portion including a housing cooperating with the cargo area, the receiving portion housing including a channel provided in and extending at least partially through the housing;
wherein the channel includes a first passage configured to receive the securement member and a second passage configured to guide the body of the locking portion securement member between at least a first position and a second position to receive and engage the locking portion securement member.

2. The securement system of claim 1 further comprising a handle assembly disposed on the cover panel, the handle assembly including a handle housing having a first portion, an opposing second portion cooperating with the first end of the locking portion body and a recess defined therebetween.

3. The securement system of claim 1 wherein the locking portion body further comprises a first end wall, a second end wall and an opposing pair of sidewalls extending therebetween, wherein the second end wall includes an angular guide surface extending between the first end of the locking portion body and the locking portion securement member on the second end of the locking portion body.

4. The securement system of claim 3 wherein the angular guide surface of the second wall of the locking portion body cooperates with the second passage of the receiving portion channel to position the locking portion securement member adjacent a surface of the receiving portion housing when the locking portion is moved from the first or second position to a third position.

5. The securement system of claim 1 wherein the first and second passages of the receiving portion channel are formed in a cross-shaped pattern in the receiving portion housing.

6. The securement system of claim 1 wherein the locking portion securement member is formed as a cylindrical projection on the second end of the locking portion body and is sized to extend through the first passage of the receiving portion channel.

7. A storage area in a vehicle cargo area at least partially defined between opposing sidewalls and a load floor of the vehicle comprising:
a storage area housing disposed adjacent an opening in the load floor;
a cover panel adjustably connected adjacent the load floor opening movable between a first position at least partially covering the storage area housing and at least one second position;
a handle assembly disposed on the cover panel including a handle housing defining a first portion, an opposing second portion and a recess defined therebetween; and
a securement system cooperating with the handle assembly to releasably secure the cover panel adjacent the storage area housing having:
a locking portion including a body having a first end cooperating with the second portion of the handle housing and an opposing second end terminating at a securement member; and
a receiving portion cooperating with the storage area housing, the receiving portion including a channel provided in and extending at least partially through the storage area housing;

wherein the channel includes a first passage configured to receive the locking portion securement member and a second passage configured to guide the body of the locking portion securement member between at least a first position and a second engaged position to receive and engage the locking portion securement member.

8. The storage area of claim 7 wherein the storage area housing is integrally formed with the opening in the load floor of the vehicle.

9. The storage area of claim 7 wherein the locking portion body further comprises a first end wall, a second end wall and an opposing pair of sidewalls extending therebetween, wherein the second end wall includes an angular guide surface extending between the first end of the locking portion body and the locking portion securement member on the second end of the locking portion body.

10. The storage area of claim 9 wherein the angular guide surface of the second wall of the locking portion body cooperates with the second passage of the receiving portion channel to position the locking portion securement member adjacent a surface of the receiving portion when the locking portion is moved from the first or second position to a third position.

11. The storage area of claim 9 wherein the first end wall of the locking portion body further comprises a generally vertical surface that cooperates with the second passage of the receiving portion to position the locking portion securement member in the second position.

12. The storage area of claim 9 wherein the angled guide surface of the second end wall of the locking portion body cooperates with the second passage to position the locking portion securement member adjacent the surface of the receiving portion housing when the locking portion is moved from the first position or the second position to a third position.

13. The storage area of claim 7 wherein the first and second passages of the channel of the receiving portion channel are formed in a cross-shaped pattern in the receiving portion housing.

14. The storage area of claim 7 wherein the locking portion securement member is formed as a cylindrical projection on the second end of the locking portion body that is sized to extend through the first passage of the channel of the receiving portion.

15. A vehicle comprising:
a cargo area at least partially defined between opposing sidewalls and a load floor;
a storage area provided in the cargo area, the storage area including a storage area housing disposed adjacent an opening in the load floor and a cover panel adjustably connected adjacent the load floor opening movable between a first position at least partially covering the storage area housing and at least one second position;
a handle assembly disposed on the cover panel including a handle housing defining a first portion, an opposing second portion and a recess defined therebetween; and
a securement system cooperating with the handle assembly to releasably secure the cover panel adjacent the storage area housing having:
a locking portion including a body having a first end cooperating with the second portion of the handle housing and an opposing second end terminating at a securement member; and
a receiving portion cooperating with the storage area housing, the receiving portion including a channel provided in and extending at least partially through the storage area housing;
wherein the channel includes a first passage configured to receive the locking portion securement member and a second passage configured to guide the body of the locking portion securement member between at least a first position and a second engaged position to receive and engage the locking portion securement member.

16. The vehicle of claim 15 wherein the locking portion body further comprises a first end wall, a second end wall and an opposing pair of sidewalls extending therebetween, wherein the second end wall includes an angular guide surface extending between the upper end of the locking portion body and the locking portion securement member on the lower end of the locking portion body.

17. The vehicle of claim 16 wherein the first end wall of the locking portion body further comprises a generally vertical surface that cooperates with the second passage of the receiving portion to position the locking portion securement member in the second position.

18. The vehicle of claim 16 wherein the angular guide surface of the second wall of the locking portion body cooperates with the second passage of the receiving portion channel to position the locking portion securement member adjacent a surface of the receiving portion when the locking portion is moved from the first or second position to a third position.

19. The vehicle of claim 15 wherein the first and second passages of the channel of the receiving portion are disposed in a cross-shaped pattern in the receiving portion housing.

20. The vehicle of claim 15 wherein the securement member is formed as a cylindrical projection on the second end of the locking portion body that is sized to extend through the first passage of the channel of the receiving portion.

* * * * *